United States Patent
Drake

[11] 3,896,174
[45] July 22, 1975

[54] CATALYTIC HYDROGENATION OF UNSATURATED DINITRILES EMPLOYING RUTHENIUM, NICKEL OR MIXTURE THEREOF AS CATALYTIC AGENT

[75] Inventor: Charles A. Drake, Bartlesville, Okla.

[73] Assignee: Phillips Petroleum Company, Bartlesville, Okla.

[22] Filed: Nov. 19, 1973

[21] Appl. No.: 416,785

[52] U.S. Cl............................ 260/583 P; 260/583 K
[51] Int. Cl.².......................................... C07C 87/14
[58] Field of Search.................... 260/583 K, 583 P

[56] References Cited
UNITED STATES PATENTS

| | | | |
|---|---|---|---|
| 2,460,733 | 2/1949 | Bruson et al.................. | 260/583 K |
| 2,956,075 | 10/1960 | Boffa et al..................... | 260/583 K |
| 3,471,563 | 10/1969 | Brake............................. | 260/583 K |

Primary Examiner—Joseph P. Brust

[57] ABSTRACT

The catalytic hydrogenation of an unsaturated dinitrile reactant of the formula

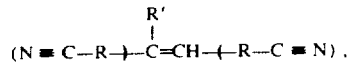

wherein each R is an alkylene or an alkylidene radical, and each R' is an alkyl radical, is carried out in the presence of $NH_3$, hydrogen, a diluent selected from aliphatic tertiary alcohols having 4 to 12 carbon atoms, unsubstituted acyclic or cyclic ethers having 4 to 12 carbon atoms per molecule, and hydrocarbons having 4 to 12 carbon atoms per molecule, and a catalyst selected from elemental ruthenium, elemental nickel, a ruthenium compound which is reducible by hydrogen to elemental ruthenium, a nickel compound which is reducible by hydrogen to elemental nickel, and mixtures thereof.

16 Claims, No Drawings

CATALYTIC HYDROGENATION OF UNSATURATED DINITRILES EMPLOYING RUTHENIUM, NICKEL OR MIXTURE THEREOF AS CATALYTIC AGENT

This invention relates to a process for the preparation of saturated aliphatic diamines by the catalytic hydrogenation of unsaturated aliphatic dinitriles.

In general, various processes for the catalytic hydrogenation of unsaturated aliphatic dinitriles to saturated aliphatic diamines are known to the art. Group VIII metal catalysts such as cobalt, nickel, ruthenium, rhodium, or palladium have been employed as effective catalysts for the hydrogenation of various feedstocks in these processes. However, it has been discovered that many of these hydrogenation catalyst materials are not always efficient or effective for the hydrogenation of unsaturated aliphatic dinitriles having the formula

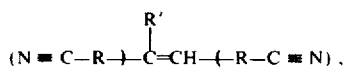

wherein each R is an alkylene or an alkylidene radical, and each R' is an alkyl radical.

In accordance with this invention these branched-chain unsaturated aliphatic dinitriles can be efficiently reduced to branched-chain saturated aliphatic diamines by the use of a catalyst selected from the group consisting of ruthenium, nickel, ruthenium or nickel compounds which are reducible by hydrogen to the elemental form, and mixtures thereof, in the presence of ammonia, hydrogen, and a diluent selected from the group consisting of aliphatic tertiary alcohols having from 4 to 12 carbon atoms per molecule, unsubstituted acyclic and unsubstituted cyclic ethers having 4 to 12 carbon atoms per molecule, and saturated hydrocarbons having 4 to 12 carbon atoms per molecule, the diluent being at least one of said alcohols or said ethers when said catalyst contains nickel and being at least one of said alcohols or said hydrocarbons when said catalyst contains ruthenium.

It is an object of this invention to provide a process for the catalytic hydrogenation of branched-chain unsaturated aliphatic dinitriles to branched-chain saturated aliphatic diamines. Another object is to provide an efficient one-step process for the catalytic hydrogenation of an unsaturated dinitrile having the formula

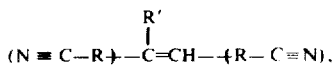

wherein each R is an alkylene or an alkylidene radical, and each R' is an alkyl radical. Still another object is to provide an efficient process for the catalytic hydrogenation of a mixture of branched-chain unsaturated aliphatic dinitriles to produce saturated aliphatic diamines. Still another object is to provide an efficient process for the catalytic hydrogenation of branched-chain unsaturated aliphatic dinitriles under reaction conditions which limit the occurrence of by-product reactions. Other objects, aspects and advantages of the invention will be apparent from a study of the specification and the appended claims.

The branched-chain unsaturated aliphatic dinitriles which are considered to be advantageously and efficiently hydrogenated in accordance with the process of this invention are the unsaturated dinitriles of the formula:

(I) 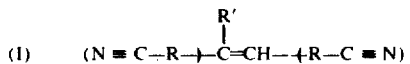

wherein each R is independently selected from the group consisting of an alkylene radical and an alkylidene radical, and R' is an alkyl radical. Each R will generally have from 1 to 15 carbon atoms, preferably from 1 to 6, and more preferably from 1 to 3 carbon atoms. R' will generally have from 1 to 15 carbon atoms, preferably from 1 to 6 carbon atoms, and more preferably from 1 to 3 carbon atoms. In general, the unsaturated dinitrile reactant of formula (I) will contain from 7 to 30 carbon atoms, preferably from 8 to 16 carbon atoms, and more preferably from 9 to 12 carbon atoms.

Representative of unsaturated reactant species of formula (I) include such compounds as 4-methyl-3-hexenedinitrile, 4-ethyl-3-hexenedinitrile, 5-methyl-4-nonenedinitrile, 5-ethyl-4-decenedinitrile, 7-methyl-6-tridecenedinitrile, 7-methyl-6-pentadecenedinitrile, 1-2-methyl-12-tetracosenedinitrile, 10-hexyl-9-tetracosenedinitrile, 2,3-dimethyl-3-hexenedinitrile, 2,4,6-trimethyl-3-heptenedinitrile, 4-ethyl-6,7-dimethyl-3-octenedinitrile, 2,4,6-triethyl-3-octenedinitrile, 2-ethyl-4,6-dipropyl-3-octenedinitrile, 2-methyl-4,6,8,10-tetrapropyl-3-dodecenedinitrile, 2,4,7, 9,11,-13,15-heptaethyl-6-hexadecenedinitrile, and mixtures thereof.

If desired, other unsaturated dinitrile reactants can be present and effectively hydrogenated during the hydrogenation of the unsaturated dinitriles of formula (I). Thus, in addition to the unsaturated dinitrile reactants of formula (I), the dinitrile feedstock can contain one or more unsaturated dinitrile reactants of the formula:

(II) 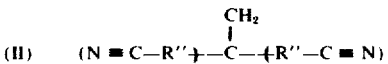

wherein each R" is independently selected from the group consisting of an alkylene radical and an alkylidene radical. In general, each R" will have from 1 to 15 carbon atoms, preferably from 1 to 7 carbon atoms, and more preferably from 1 to 4 carbon atoms. The dinitriles of formula (II) will generally contain from 6 to 30 carbon atoms, preferably from 8 to 16 carbon atoms, and more preferably from 9 to 12 carbon atoms.

Representative unsaturated dinitrile reactants of formula (II) include such compounds as 3-methylenehexanedinitrile, 4-methyleneheptanedinitrile, 5-methylenenonanedinitrile, 6-methyleneundecanedinitrile, 7-methylenetridecanedinitrile, 8-methylenepentadecanedinitrile, 12-methylenetetracosanedinitrile, 15-methylenenonacosanedinitrile, 2-methyl-3-methylenepentanedinitrile, 2,4-dimethyl-3-methylenepentanedinitrile, 2-methyl-4-methyleneoctanedinitrile, 2-methyl-7-ethyl-4-methyleneoctanedinitrile, 2,4,8-trimethyl-6-methylenedodecanedinitrile, 2,4,8,10-tetrapropyl-6- methylenedodecanedinitrile, 2,26-dimethyl-14-methyleneheptacosanedinitrile, and mixtures thereof.

Unsaturated dinitriles having a structure other than that of formulas (I) and (II) can be present during the hydrogenation reaction, if desired. Similarly, other compounds which may be found in the feed source of the dinitriles of formulas (I) and (II) can be present so long as such additional compounds do not significantly adversely affect the hydrogenation of the dinitriles of formulas (I) and (II). Where other dinitriles are present in the feedstock, the dinitriles of formula (I) will generally constitute at least 0.1 weight percent of the total dinitriles. The significant advantages of the invention increase with increasing concentrations of the dinitriles of formula (I) in the feedstock. Thus, the process of the invention is even more advantageous for concentrations of the dinitriles of formula (I) in the feedstock of at least 5 weight percent. The invention is considered to be particularly desirable for dinitrile feedstocks having a concentration of the dinitriles of formula (I) of at least 10 weight percent.

A presently preferred branched-chain unsaturated aliphatic dinitrile feedstock for employment in the practice of this invention is the dinitrile reaction product mixture obtained by the reaction of isobutylene and acrylonitrile. This dinitrile reaction product mixture generally comprises 5-methyl-4-nonenedinitrile, 2,4-dimethyl-4-octenedinitrile, 2,4-dimethyl-3-octenedinitrile, 2,4,6-trimethyl-3-heptenedinitrile, 5-methylenenonanedinitrile, 2-methyl-4-methyleneoctanedinitrile, and 2,6-dimethyl-4-methyleneheptanedinitrile. The first four named compounds in this mixture are of the type of formula (I), while the last three named compounds in this mixture are of the type of formula (II). The weight ratio of the dinitriles of formula (I) to the dinitriles of formula (II) in this mixture is generally in the range of about 10:1 to about 1:10.

In the practice of this invention, the catalytic hydrogenation of the unsaturated dinitrile reactant of formula (I) results primarily in the formation of saturated diamine reaction products having the formula:

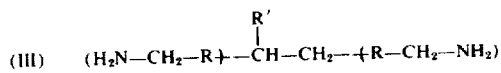

(III)    (H₂N—CH₂—R)—CH—CH₂—(R—CH₂—NH₂)

wherein R and R' are as defined hereinbefore. The catalytic hydrogenation of an unsaturated dinitrile reactant of formula (II) results primarily in the formation of saturated diamine reaction products having the formula:

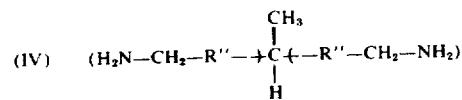

(IV)    (H₂N—CH₂—R")—C—(R"—CH₂—NH₂)

wherein R" is as defined hereinbefore.

The practice of this invention is particularly suited to the catalytic hydrogenation of this mixture of species of formula (I) and formula (II) for the purpose of achieving saturated diamine reaction products which are substantially free of any olefinic unsaturation and preferably essentially free of any olefinic unsaturation. The phrase "substantially free of olefinic unsaturation" signifies that the diamine reaction products contain less than about 1 weight percent unsaturated diamine reaction product based on the total weight of unsaturated and saturated diamine reaction products wherein the weight percents are determined by conventional gas-liquid chromatographic analysis (GLC). The phrase "essentially free of olefinic unsaturation" signifies that the diamine reaction products contain less than about 0.1 weight percent unsaturated diamine reaction product based on the total weight of unsaturated and saturated diamine reaction products wherein the weight percents are determined by conventional GLC analysis techniques. These diamine reaction products which are at least substantially free, and preferably essentially free, of olefinic unsaturation are advantageously employed in the preparation of linear terephthalamide polymers.

One of the most important advantages of the catalytic hydrogenation process of this invention is directly related to the production of a mixture of diamines which are essentially free of olefinic unsaturation from the unsaturated dinitrile product mixture produced by the reaction of acrylonitrile and isobutylene. This advantage is significant since prior art catalytic hydrogenation of the acrylonitrile and isobutylene reaction product mixture failed to substantially or completely reduce the olefinic unsaturation of the unsaturated dinitrile feedstock, thereby producing a reaction product mixture containing branched-chain aliphatic diamines having substantial olefinic unsaturation in the carbon skeleton. The separation of the branched-chain olefinically unsaturated diamines from the saturated diamines is inconvenient, and polyamides prepared from the mixtures containing a significant amount of unsaturated diamines have been found to be unsuited or undesirable in the preparation of polyamide fibers, particularly the terephthalamide polymers. Thus, the catalytic hydrogenation of this invention is a significant advance in the preparation of such polyamides.

The catalysts that are considered to be suitable for employment in the catalytic hydrogenation process of this invention include finely divided elemental ruthenium, elemental nickel, compounds of ruthenium or nickel which are reducible by hydrogen to finely divided elemental ruthenium or nickel, and mixtures thereof. Suitable reducible compounds include the oxides, halides, nitrates, sulfates, oxalates, acetates, carbamates, propionates, tartrates, hydroxides, and the like, and mixtures thereof. Specific examples include ruthenium oxide, ruthenium chloride, ruthenium nitrate, ruthenium acetate, ruthenium carbonate, ruthenium hydroxide, elemental nickel, Raney nickel, nickel oxide, nickel chloride, nickel nitrate, nickel oxalate, nickel acetate, and nickel hydroxide, and the like. Catalyst mixtures comprising ruthenium and nickel can be employed in any weight ratio of ruthenium to nickel without deleteriously affecting the catalytic hydrogenation benefits associated with the practice of this invention. The weight ratio of catalyst to unsaturated dinitrile reactant, based on the weight of the total of ruthenium and nickel contained therein, can be varied as desired. For the purpose of maintaining reasonable reaction rates under economically attractive catalyst reaction kinetics, it is generally preferred that the weight ratio of the total of nickel and ruthenium to the unsaturated dinitrile reactants be maintained within a range of about 0.01:100 to about 30:100, and preferably in the range of about 0.1:100 to about 20:100.

In the practice of this invention, it is often desirable to employ catalytic amounts of elemental ruthenium, elemental nickel, reducible compounds of ruthenium or nickel, or mixtures thereof supported by a solid catalyst carrier which does not deleteriously affect the catalytic hydrogenation process of this invention. Such supports include, for example, carbon, kieselguhr, silica, alumina, silica-alumina, calcium carbonate, barium carbonate, asbestos, pumice, clays, and the like, and mixtures thereof. The nickel and/or ruthenium catalyst can be added to the catalyst support by any of the methods well known in the art. For example, the supported catalysts can be prepared by dry mixing the components or by impregnating the support with a solution or dispersion of nickel and/or ruthenium in elemental form or in the form of reducible compounds thereof. The supported catalyst can be pretreated with hydrogen to reduce the compounds, or such reduction can be achieved in the hydrogenation reactor. When a support is employed, the elemental ruthenium and/or elemental nickel content will generally be in the range of about 0.5 to about 50 weight percent, preferably in the range of about 1 to about 10 weight percent, based on the weight of the total catalyst components. Presently preferred catalysts include ruthenium on alumina, having a ruthenium metal content of about 5 percent by weight, based on the total weight of the catalyst and the support material, and Raney nickel. These presently preferred catalytic forms, as well as other suitable catalysts such as ruthenium dioxide or 5 weight percent ruthenium on charcoal are commercially available.

Any catalytic hydrogenation temperature can be employed which provides the desired degree of catalytic efficiency in the hydrogenation of the branched-chain saturated aliphatic dinitrile containing feedstock. The hydrogenation temperatures will generally be within the range of about 30° to about 250° C. With ruthenium catalysts the effective catalytic hydrogenation temperatures are preferably within the range of about 100° to about 250° C., and more preferably are within the range of about 130° to about 180° C. With nickel catalysts the effective catalytic hydrogenation temperatures are preferably within the range of about 100° to about 200° C., and more preferably are within the range of about 125° to about 160° C.

The catalytic hydrogenation of branched-chain unsaturated aliphatic dinitriles can be carried out at any hydrogen pressure wherein both the olefinic unsaturation and the nitrile groups are reduced in the presence of ammonia, hydrogen and a suitable diluent. Generally, suitable hydrogen pressures are within the range of from about 500 to about 5000 psig, but lower or even higher hydrogen pressures can be employed. Preferably, due to economic considerations, hydrogen pressures within the range of about 1000 to about 3000 psig are employed. Higher hydrogen pressures may be desirable at lower reaction temperatures in order to achieve complete reduction within a reasonable reaction time.

Any time interval suited for the catalytic hydrogenation of branched-chain unsaturated aliphatic dinitriles can be employed in the practice of this invention. However, time intervals economically attractive to the process are generally within the range of about 15 minutes to about 5 hours for a batch hydrogenation process. A reaction time in the range of about 1 to about 3 hours is presently preferred in order to insure substantially complete hydrogenation of any unsaturated olefinic bonds in the feedstock as well as complete hydrogenation of the nitrile groups to primary amino groups. The catalytic hydrogenation of unsaturated dinitriles in accordance with the process of this invention can be carried out as a continuous process at any suitable liquid hourly space velocity (LHSV). However, the liquid hourly space velocity rates will generally be within the range of about 0.1 to about 10, more preferably from about 0.5 to about 2, volumes of unsaturated dinitrile reactant plus diluent per volume of catalyst (including the volume of any catalyst support if any is present).

The diluent is selected from the class consisting of aliphatic tertiary alcohols containing from 4 to 12 carbon atoms per molecule, unsubstituted acyclic and unsubstituted cyclic ethers having from 4 to 12 carbon atoms per molecule, and saturated hydrocarbons having 4 to 12 carbon atoms per molecule, and mixtures thereof. The term "unsubstituted" signifies that there are no substituents other than hydorcarbyl radicals. When a ruthenium catalyst is employed, it is preferred that the diluent be an aliphatic tertiary alcohol or a saturated hydrocarbon. When a nickel catalyst is employed it is preferred that the diluent be one of said aliphatic tertiary alcohols or one of said ethers. Examples of alcohol diluents include 2-methyl-2-propanol, 2-methyl-2-butanol, 3-ethyl-3-hexanol, 2,4-dimethyl-2-pentanol, 2,3-dimethyl-3-pentanol, 3-ethyl-3-pentanol, 3,7-dimethyl-3-octanol, and the like, and mixtures thereof. The foregoing examples of saturated aliphatic alcohols are unsubstituted tertiary alkanols having at least 4 carbon atoms per molecule. Examples of alkanes and cycloalkanes include butane, pentane, hexane, decane, dodecane, cyclobutane, cyclopentane, cyclohexane, cyclodecane, cyclododecane, 2-methylbutane, methylcyclopentane, 2,2,4-trimethylpentane, and mixtures thereof. Examples of ethers include 1,3-dioxane, 1,4-dioxane, tetrahydrofuran, 4,4-dimethyl-1,3-dioxane, and mixtures thereof. To facilitate handling of the reaction mixtures, the weight ratio of unsaturated dinitrile reactants to diluent charged to the reaction zone is generally within the weight ratio range of about 0.001:100 to about 15:100, and is preferably in the range of about 0.1:100 to about 12:100.

Ammonia is employed in the process of this invention as a means of suppressing undesirable side reactions such as the formation of secondary and tertiary amines. Any amount of ammonia can be employed which is effective in deterring or reducing undesirable side reactions. In general, the mol ratio of ammonia to cyano group (there being two cyano groups in each unsaturated dinitrile) will be in the range of about 1:1 to about 25:1, and preferably will be in the range of about 7:1 to about 15:1.

Recovery of the desired end product, the branched-chain saturated aliphatic diamines, including preferred branched-chain saturated aliphatic diamine reaction products which contain less than about 0.1 percent unsaturated diamine by weight of the total reaction product as determined by GLC, as well as any resulting reaction byproducts, any unconsumed reactants, ammonia, hydrogen, and/or diluents can be carried out by any conventional separation means. In general, at the conclusion of the catalytic hydrogenation process, the reaction effluent is cooled and depressurized with the recovery, if desired, of any ammonia or diluent which is vented from the reaction effluent during the depressurization operation. The ammonia or diluent can be returned or recycled to the hydrogenation zone if desired. The reaction products can be separated from the catalyst by conventional filtration means. The filtrate containing the at least substantially completely saturated diamines can be conveniently separated from any reaction byproducts or any diluent remaining in the filtrate by a conventional fraction distillation.

The following examples are presented in further illustration of the invention.

EXAMPLE I

A one liter autoclave was charged with 30 g (0.185 mol) of the purified reaction product of two mols of acrylonitrile with 1 mol of isobutylene. This reaction product consisted essentially of a mixture of isomeric unsaturated dinitriles having one carbon-carbon double bond and 10 carbon atoms per molecule. The principal isomers were 5-methylenenonanedinitrile and 5-methyl-4-nonenedinitrile with very small amounts of more highly branched isomers such as 2-methyl-4-methylene-octanedinitrile, among others. For simplicity, the above-described reaction product will hereafter be called diadduct. Also charged to the one liter autoclave was 300 ml (236 g) of 2-methyl-2-propanol and 2.0 g of ruthenium dioxide ($RuO_2$). The system was flushed with nitrogen and then charged with 60 g (3.53 mol) of ammonia. The reactor was then pressured with hydrogen to 1400 psig and heated to 170° C. The mixture was stirred throughout the reaction period of about 2 hours. At the end of the reaction period, the reactor was cooled, vented and the contents filtered to remove the catalyst. The filtrate was distilled under vacuum to remove essentially all of the diluent, providing 29.0 g (91 percent yield) of the saturated diamines and 2.0 g of heavies (distillation residue). GLC analysis of the reaction product indicated that the reduction of the unsaturated dinitriles to saturated diamines was complete.

EXAMPLE II

A 1 liter autoclave was charged with 400 ml (314 g) of 2-methyl-2-propanol, 35 g (0.216 mol) of the diadduct described in Example I, and 5.0 g of ruthenium on alumina (5% by weight ruthenium) catalyst. The system was flushed with nitrogen, charged with 70 g (4.12 mol) ammonia, pressured to 1400 psig with hydrogen and heated at 170° C. for 2 hours. The reactor was then cooled, vented, and the contents filtered. The filtrate was concentrated as described in Example I. GLC analysis of the product indicated complete reduction to the saturated diamine had been accomplished. The product was fractionally distilled to provide 28.5 g of saturated diamines (76% yield) and 6.0 g of heavies. The large cut (23 g) of saturated diamine product was submitted for analysis by nuclear magnetic resonance (NMR) and mass spectrum methods. These methods found no evidence of tert-butyl groups in the product such as would be present if N-alkylation had occurred from the diluent.

EXAMPLE III

A 1 liter autoclave was charged with 400 ml (274 g) of n-heptane, 5 g of ruthenium on alumina (5% by weight ruthenium) and 35 g (0.216 mol) of the diadduct described in Example I. The system was flushed with nitrogen, charged with 70 g (4.12 mol) ammonia, pressured to 1400 psig with hydrogen and heated at 170° C for 2 hours. At the end of the reaction period the reactor was cooled, vented and the contents filtered. The filtrate was concentrated by evaporation of the diluent under vacuum. Analysis of the product by GLC indicated complete reduction of the unsaturated dinitrile to the saturated diamine had been accomplished. Fractional distillation of the product provided 33.0g (89% yield) of the saturated diamines and 2.0 g of heavies. This result indicated that hydrocarbons could be employed as diluents according to this invention with complete hydrogenation being achieved.

EXAMPLE IV

A 1 liter autoclave was charged with 350 ml (275 g) of tertbutyl alcohol, 20 g (0.123 mol) of the diadduct described in Example I and 10 g Raney nickel. The system was flushed with nitrogen, charged with 40 g (2.35 mol) ammonia, pressured to 1400 psig with hydrogen and heated at 150° C. for 2 hours. At the end of the reaction period the reactor was cooled, vented and the contents filtered. The filtrate was concentrated by evaporating essentially all of the diluent under vacuum. GLC analysis of the product indicated that complete hydrogenation to the saturated diamine had been accomplished. Fractional distillation of the product provided 15.0 g (71% yield) of saturated diamines and 6.0 g of heavies.

EXAMPLE V

A 1 liter autoclave was charged with 350 ml (362 g) of 1,4-dioxane, 20 g (0.123 mol) of the diadduct described in Example I, and 10 g of Raney nickel. The system was flushed with nitrogen, charged with 40 g (2.35 mol) of ammonia, pressured to 1400 psig with hydrogen and heated at 130° C. for 2 hours. At the end of the reaction period the reactor was cooled, vented and the contents filtered. The filtrate was concentrated by evaporating essentially all of the diluent and ammonia under vacuum.

The product obtained in the above steps was charged along with 350 ml (362 g) 1,4-dioxane and 10 g of Raney nickel to a 1 liter autoclave. The reactor was flushed with nitrogen, pressured to 1400 psig with hydrogen and heated at 130° C. for 2 hours. The product was recovered as before and analyzed by GLC which showed the product contained no unsaturated diamines. The product was fractionally distilled to provide 16.5 g (78% yield) of saturated diamines and 4.0 g of heavies.

EXAMPLE VI

A 1 liter autoclave was charged with 400 ml (414 g) of 1,4-dioxane, 20 g (0.123 mol) diadduct and 10 g of Raney nickel. The system was flushed with nitrogen, charged with 40 g (2.35 mol) ammonia, pressured to 1400 psig with hydrogen and heated to 160° C. for 2 hours. The reactor was cooled, vented, and the contents filtered. The filtrate was concentrated by evaporating essentially all of the diluent under vacuum. GLC analysis of the product indicated essentially complete reduction to the saturated diamines. The product was fractionally distilled to provide 16.0 g (76% yield) of saturated diamines and 4.5 g of heavies.

EXAMPLE VII

A series of runs was made to determine the effects of variations in reaction conditions on the extent of hydrogenation. In each run 350 ml (278 g) of t-butyl alcohol, 30 g (0.185 mol) of the diadduct described in Example I, and 5 g of ruthenium on alumina (5% by weight ruthenium) were charged to a 1 liter autoclave. The reactor was flushed with nitrogen, charged with 60 g (3.5 mol) of ammonia and pressured to the desired level with hydrogen. At the conclusion of each run the reactor was cooled, vented and the contents filtered to remove the catalyst. The filtrate was concentrated by evaporation of the diluent and then analyzed by GLC for extent of hydrogenation. The results are tabulated below.

| Run No. | Hydrogen psig | Temp. °C. | Time Hrs. | Hydrogenation to Saturated Diamine |
|---|---|---|---|---|
| 1 | 1,000 | 170 | 2.25 | Incomplete |
| 2 | 1,000 | 170 | 2.25 | Incomplete |
| 3 | 1,100 | 170 | 2.25 | Complete |
| 4 | 1,250 | 170 | 2.25 | Complete |
| 5 | 800 | 200 | 2 | Complete |

It can be seen that by raising the temperature of the hydrogenation reaction the hydrogen pressure can be lowered while still obtaining complete hydrogenation in essentially the same reaction time. Therefore, one skilled in the art can select hydrogenation reaction conditions within the broad ranges previously given in order to obtain complete hydrogenation but should also rely on GLC analysis or an equivalent sensitive analytical method to assure that such conditions in combination were suitable for achieving complete hydrogenation.

EXAMPLE VIII

A series of seven identical runs was carried out in the 1-liter autoclave employing the same reaction conditions and amounts of reactants as used in Example II. The product from each run was also recovered in the same manner as that described in Example II with the exception that the condensed filtrate from each of the runs was combined to provide a single product for fractional distillation. GLC analysis of each of the condensed filtrates had shown that hydrogenation of the unsaturated dinitriles to the saturated diamines was complete. Fractional distillation of the combined condensed filtrates provided 240.5 g of saturated diamines for a yield of 92% and only 8.0 g (3.2%) of heavies.

COMPARATIVE EXAMPLE A

In a control run, a one liter autoclave was charged with 350 ml (277 g) of methanol, 30 g (0.185 mol) of diadduct, and 4 g of ruthenium on alumina (5 percent by weight ruthenium) catalyst. The system was flushed with nitrogen, charged with 60 g (3.53 mol) ammonia and heated to about 170° C. for about 2.5 hours. GLC analysis of the product obtained in the usual manner indicated that a considerable amount of carbon-carbon unsaturation remained in the product, i.e., hydrogenation was not complete under these conditions.

COMPARATIVE EXAMPLE B

In a control run, a 1 liter autoclave was charged with 350 ml (284 g) 1-butanol, 30 g (0.185 mol) diadduct and 5 g of ruthenium on alumina (5% by weight ruthenium) catalyst. The system was flushed with nitrogen, charged with 60 g (3.53 mol) ammonia, pressured to 1500 psig with hydrogen and heated at 170° C. for 2 hours. The reactor was cooled, vented, and the contents filtered. The filtrate was concentrated by evaporation of the diluent under vacuum. Analysis of the product by GLC indicated that hydrogenation to the saturated diamine was not complete under the conditions employed. This result is to be contrasted with that obtained in Example I above.

COMPARATIVE EXAMPLE C

As a control run, the one liter autoclave was charged with 350 ml (277 g) of methanol, 5 g of palladium on carbon (5 weight percent palladium, based on total catalyst composition) and 20 g (0.123 mol) of the previously described diadduct. The system was flushed with nitrogen and charged with 40 g (2.35 mol) ammonia, pressured to 1400 psig with hydrogen and heated to 170° C. for a 2-hour reaction period. The autoclave was then cooled, vented, and the contents filtered. The filtrate was concentrated by evaporating essentially all of the diluent under vacuum. Analysis of the product residue from the concentration step by GLC showed that essentially no diamines were produced and that the major amount of recovered material was unreacted starting compound (diadduct). This run indicates the surprising reactivity of the catalysts of the invention compared to a control catalyst.

COMPARATIVE EXAMPLE D

A 1 liter autoclave was charged with 5 g of 5% palladium on alumina, 30g (0.185 mol) diadduct and 350 ml (276 g) ethanol. The reactor was flushed with nitrogen, charged with 60 g (3.5 mols) of ammonia and pressured to 1500 psig with hydrogen. The reaction mixture was heated at 100° C. for 1 hour but no hydrogen uptake was observed. The reaction mixture was then heated at 130° C. and finally at 160° C. with also no apparent uptake of hydrogen. The reactor was cooled, vented and the contents filtered. Analysis of the reaction product indicated that the starting material was recovered essentially unchanged.

COMPARATIVE EXAMPLE E

A run employing Raney cobalt was made as a control run. In this run, the 1 liter autoclave was charged with 300 ml (237 g) methanol, 30 g (0.185 mol) of the diadduct, described in Example I, and 10 g of Raney cobalt catalyst. The system was flushed with nitrogen, charged with 60 g (3.53 mol) of ammonia and pressured to 1500 psig with hydrogen. The reaction mixture was heated from 58° to 190° C. in the first hour then maintained at 190° C. for the last 2 hours of the approximately 3-hour reaction period. The reactor was cooled, vented, and the contents filtered. The filtrate was analyzed by GLC from which it was estimated that about 50 weight percent of the product was saturated diamines while unsaturated diamines accounted for about 30 weight percent and heavies accounted for 20 weight percent of the product. This run demonstrated that a catalyst of the prior art was not entirely effective under the conditions employed for producing a saturated diamine from the unsaturated dinitrile.

COMPARATIVE EXAMPLE F

A run was carried out under essentially the same condititons as those employed in Comparative Example E except that 10 g of Raney nickel was employed as the catalyst. Analysis of the product mixture by GLC showed that about 65 weight percent was the saturated diamine, about 10 weight percent was unsaturated diamine, and about 20 weight percent was heavy residue (heavies). This result demonstrates that Raney nickel with methanol diluent was not fully effective in hydrogenating the unsaturated dinitriles to saturated diamines under the conditions employed.

COMPARATIVE EXAMPLE G

A 1 liter autoclave was charged with 10 g of Raney nickel, 30 g (0.185 mol) diadduct, and 350 ml (284 g) n-butanol. The reactor was flushed with nitrogen, charged with 60 g (3.5 mol) ammonia and pressured to 1500 psig with hydrogen. The reaction mixture was heated with stirring at 170° C. for 2 hours. The reactor was cooled, vented and the contents filtered. The filtrate was concentrated by use of a rotary evaporator under vacuum. The concentrate was analyzed by GLC. The analysis indicated that nitrile group reduction was incomplete and that very little if any olefinic reduction had taken place. Some very high boiling point material (heavies) was also formed during the hydrogenation.

What is claimed is:

1. A single stage reaction process for the catalytic hydrogenation of an unsaturated dinitrile feedstock comprising at least one unsaturated dinitrile compound of the formula

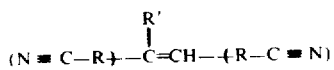

wherein each R is independently selected from the group consisting of an alkylene radical and an alkylidene radical, R' is an alkyl radical, and the number of carbon atoms in said compound is in the range of 7 to 30; which comprises contacting said feedstock under suitable hydrogenation conditions in a single stage reaction zone with ammonia; hydrogen; and a catalyst consisting essentially of a catalytic component selected from elemental ruthenium, elemental nickel, ruthenium compounds which are reducible by hydrogen to elemental ruthenium at said hydrogenation conditions, nickel compounds which are reducible by hydrogen to elemental nickel at said hydrogenation conditions, and mixtures thereof; in a diluent consisting essentially of at least one component selected from the group consisting of unsubstituted tertiary alkanols having from 4 to 12 carbon atoms per molecule, unsubstituted acyclic and unsubstituted cyclic ethers having from 4 to 12 carbon atoms per molecule, and saturated hydrocarbons having from 4 to 12 carbon atoms per molecule, said diluent consisting essentially of at least one of said alkanols or said saturated hydrocarbons when said catalyst consists essentially of elemental ruthenium or a ruthenium compound which is reducible by hydrogen to elemental ruthenium at said hydrogenation conditions and consisting essentially of at least one of said alkanols or said ethers when said catalyst consists essentially of elemental nickel or a nickel compound which is reducible by hydrogen to elemental nickel at said hydrogenation conditions; to thereby effect the at least substantially complete hydrogenation of said at least one unsaturated dinitrile compound to the corresponding branched-chain saturated aliphatic diamine.

2. A process in accordance with claim 1, wherein said feedstock further comprises at least one unsaturated dinitrile reactant of the formula:

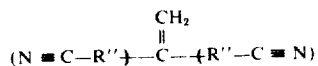

wherein each R'' is independently selected from the group consisting of an alkylene radical and an alkylidene radical, and the number of carbon atoms in said reactant is in the range of 7 to 30.

3. A process in accordance with claim 1 wherein said catalyst together with a solid catalyst support forms a catalyst composition, the content of the elemental ruthenium and/or elemental nickel being in the range of about 0.5 to about 50 weight percent of said catalyst composition.

4. A process in accordance with claim 1 wherein each of said alkylene radical, said alkylidene radical and said alkyl radical has from 1 to 15 carbon atoms.

5. A process in accordance with claim 1 wherein said at least one unsaturated dinitrile compound comprises a mixture of 5-methyl-4-nonenedinitrile, 2,4-dimethyl-4-octenedinitrile, 2,4-dimethyl-3-octenedinitrile, and 2,4,6-trimethyl-3-heptenedinitrile.

6. A process in accordance with claim 1 wherein said hydrogenation conditions comprise a weight ratio of the total of nickel and ruthenium present to the unsaturated dinitriles in the range of about 0.01:100 to about 30:100, a mol ratio of ammonia to cyano groups in the range of about 1:1 to about 25:1, a hydrogen pressure in the range of about 500 to about 5000 psig, a weight ratio of the unsaturated dinitriles to the diluent in the range of about 0.001:100 to about 15:100, a temperature in the range of about 30° to about 250° C, and a reaction time in the range of about 15 minutes to about 5 hours if conducted as a batch process and a liquid hourly space velocity rate in the range of about 0.1 to about 10 volumes of unsaturated dinitrile plus diluent per volume of catalyst if conducted as a continuous process.

7. A process in accordance with claim 1 further comprising recovering a diamine product containing less than about 1 weight percent unsaturated diamines.

8. A process in accordance with claim 1 further comprising recovering a diamine product essentially free of unsaturation.

9. A process in accordance with claim 2 wherein said hydrogenation conditions comprise a weight ratio of the total of nickel and ruthenium present to the unsaturated dinitriles in the range of about 0.1:100 to about 20:100, a mol ratio of ammonia to cyano groups in the range of about 7:1 to about 15:1, a hydrogen pressure in the range of about 1000 to about 3000 psig, a weight ratio of the unsaturated dinitriles to the diluent in the range of about 0.1:100 to about 12:100, a temperature in the range of about 250° C and a reaction time in the range of about 15 minutes to about 5 hours when conducted as a batch process and a liquid hourly space velocity rate in the range of about 0.1 to about 10 volumes of unsaturated dinitrile plus diluent per volume of catalyst when conducted as a continuous process; wherein said at least one unsaturated dinitrile compound constitutes at least 5 weight percent of the unsaturated dinitriles in said feedstock; wherein said at least one unsaturated dinitrile compound is converted primarily to a saturated diamine having the formula:

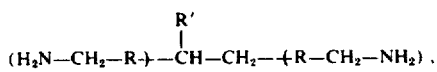

wherein R and R' are as defined hereinabove; wherein said at least one unsaturated dinitrile reactant is converted primarily to a saturated diamine having the formula:

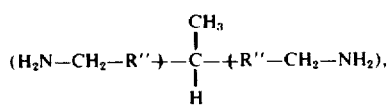

wherein R" is as defined hereinabove; and further recovering a diamine product containing less than about 1 weight percent unsaturated diamines.

10. A process in accordance with claim 9 wherein said catalyst is selected from the group consisting of elemental ruthenium, ruthenium compounds which are reducible by hydrogen to elemental ruthenium at said hydrogenation conditions and mixtures thereof, and wherein the contacting step is carried out at a temperature in the range of about 100° to about 250° C.

11. A process in accordance with claim 10 wherein said diluent consists essentially of at least one of said tertiary alkanols and said saturated hydrocarbons.

12. A process in accordance with claim 10 wherein each of said alkylene radical, said alkylidene radical and said alkyl radical has from 1 to 6 carbon atoms; and wherein said diluent consists essentially of at least one of said tertiary alkanols.

13. A process in accordance with claim 10 wherein each of said alkylene radical, said alkylidene radical and said alkyl radical has from 1 to 6 carbon atoms; and wherein said diluent consists essentially of at least one of said saturated hydrocarbons.

14. A process in accordance with claim 9 wherein said catalyst is selected from the group consisting of elemental nickel, nickel compounds which are reducible by hydrogen to elemental nickel at said hydrogenation conditions and mixtures thereof, and wherein the contacting step is carried out at a temperature in the range of about 100° to about 200° C.

15. A process in accordance with claim 13 wherein each of said alkylene radical, said alkylidene radical and said alkyl radical has from 1 to 6 carbon atoms; and wherein said diluent consists essentially of at least one of said ethers.

16. A process in accordance with claim 9 wherein said feedstock comprises 5-methylenenonanedinitrile and 5-methyl-4-nonenedinitrile.

* * * * *